US007143316B2

(12) United States Patent
Christodoulou et al.

(10) Patent No.: US 7,143,316 B2
(45) Date of Patent: Nov. 28, 2006

(54) FAULT DIAGNOSIS IN A NETWORK

(75) Inventors: Athena Christodoulou, Bristol (GB); Christopher Tofts, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 569 days.

(21) Appl. No.: 10/409,239

(22) Filed: Apr. 8, 2003

(65) Prior Publication Data
US 2004/0015746 A1    Jan. 22, 2004

(30) Foreign Application Priority Data
Jul. 19, 2002    (GB) ................. 0216800.3

(51) Int. Cl.
*G06F 11/00* (2006.01)
(52) U.S. Cl. ...................................... 714/43
(58) Field of Classification Search ................. 714/43; 710/100–317, 38; 709/224; 340/825
See application file for complete search history.

(56) References Cited
U.S. PATENT DOCUMENTS
4,380,067 A * 4/1983 Beardsley et al. ............. 714/4

| | | | | |
|---|---|---|---|---|
| 5,161,110 A | * | 11/1992 | Dorchak | 700/108 |
| 5,210,757 A | * | 5/1993 | Barlow et al. | 714/25 |
| 5,561,760 A | * | 10/1996 | Ferris et al. | 714/25 |
| 5,968,122 A | * | 10/1999 | Schlosser et al. | 709/223 |
| 6,532,552 B1 | * | 3/2003 | Benignus et al. | 714/25 |
| 6,862,690 B1 | * | 3/2005 | Bezera et al. | 714/4 |
| 6,871,299 B1 | * | 3/2005 | Cavanaugh et al. | 714/47 |
| 2002/0019870 A1 | | 2/2002 | Chirashnya et al. | |

* cited by examiner

*Primary Examiner*—Robert Beausoliel
*Assistant Examiner*—Amine Riad

(57) ABSTRACT

A fault manifested in a network between two network nodes is investigated by selecting highest probability failure modes of resources which form network pathways between the two nodes, and probing the network to establish whether any of the highest probability failure modes are the cause of the fault. If not then a group of lower probability failure modes are selected and the network is probed once again to establish whether any of the lower probability failure modes are the cause of the fault. This process may be repeated until the fault is diagnosed. Resources are defined at the discretion of an administrator, and so may be clustered groups of computing entities and network links, or defined at a level of particularity such that functional elements within a computing entity such as a network card and a driver are defined as resources.

9 Claims, 4 Drawing Sheets

FAULT DIAGNOSIS IN A NETWORK

BACKGROUND TO THE INVENTION

The present invention relates to the administration of a network, and more particularly to the diagnosis of faults within the network.

With the advent of the use of networks of computers in increasing numbers, greater attention is being paid to the manner in which such networks are administered. For example, there are a number of commercial technology and services packages, or "solutions" available currently which provide for the administration of a remotely located network, and these solutions provide greater opportunities for the devolution of responsibility for the maintenance and operation of networks. Thus for example a network serving one commercial organisation, whose area of commerce is not related to information technology or its management, and which is not therefore intrinsically competent within this field may be administered remotely under contract by another independent commercial organisation which specialises in network management. In order to be commercially viable, many such solutions incorporate some form of fault diagnosis software, to provide a remotely located administrator with an ability to diagnose faults within the network.

One desirable way of providing such a capability is to analyse the network in its constituent parts (i.e. both hardware and software) or "resources", and to consider the various states of operability of each of the resources which may have a role in causing a particular symptom. A problem with such a system however is that a large network, e.g. a network of a multinational company for example will typically have in the region of 1 million resources. If each resource's operability is considered, even in the essentially theoretical model where each resource has only two operability states (functioning and non functioning), there are $2^{1,000,000}$ (or roughly $10^{300,000}$) possible permutations of operability states for the entire network. Because of the limitations on computational power (for example even if quantum computing were used, there are insufficient atoms within the universe to provide the requisite computational capability to deal with such a big number, since there are currently thought to be only in the region of $10^{81}$ photons in the universe), it has therefore not been feasible to use such an approach in fault diagnosis.

SUMMARY OF THE INVENTION

The present invention provides an alternative approach according to which a method is provided of diagnosing a fault within a network comprising a plurality of resources each of which has at least two operability states, the fault being manifested by failure of a service at a first network node and requested from a second network node, the method comprising steps of:
identifying resources providing at least one candidate network pathway between the first and second nodes;
for at least one candidate network pathway, listing failure modes of resources identified in respect of that pathway;
selecting from the listed failure modes, a first group of failure modes having a probability in excess of a first probability;
probing the network to establish if any of the first group of failure modes is the cause of the fault.
If none of the first group of failure modes is the cause of the fault then a second group of failure modes is selected, having a probability lower than the first probability, but greater than a second probability, and the network is then probed once again to establish whether any of the second failure modes is the cause of the fault. If none of the second group of failure modes is found to be the cause, then a third group of failure modes is selected and the process repeated (and where necessary a fourth group, and so on . . . ) until a fault is located.

Resources are defined by an administrator at any suitable level of particularity, and so may be groups of computing entities and interstitial network links on the one hand, or may be individual functional elements within computing entities, in which case for example, a driver for a network card, and the network card itself may both be separate resources. Operability states of resources depend upon the nature and complexity of resources, so that a hardwired network link in the form of a cable may have only relatively few operability states (including: "hardware failure", i.e. of the cable and/or one or both connectors, and "operable" for example), whereas more complex resources are likely to have a greater number and complexity of operability states. In each case however, resources will have a minimum of two states: operable and non-operable, or states equivalent to these states.

The requested services may vary, and include for example the performance of a particular task at a first network node which is requested by a client application at a second network node for example. Alternatively, the requested service may simply be the establishment of a connection of a first network node to a second network node.

Selection of resources from candidate network pathways however is not essential, and so a further aspect of the present invention provides a method of diagnosing a fault within a network comprising the steps of:
identifying failure modes within the network having a probability greater than a first probability; and
probing resources within the network having those failure modes to establish if any of those failure modes is the cause of the fault.

Failure modes for all resources in the network may advantageously be stored in a database, for example.

BRIEF DESCRIPTION OF DRAWINGS

An embodiment of the invention will now be described, by way of example, and with reference to the accompanying drawings, in which.

DESCRIPTION OF PREFERRED EMBODIMENTS

Figure 1:
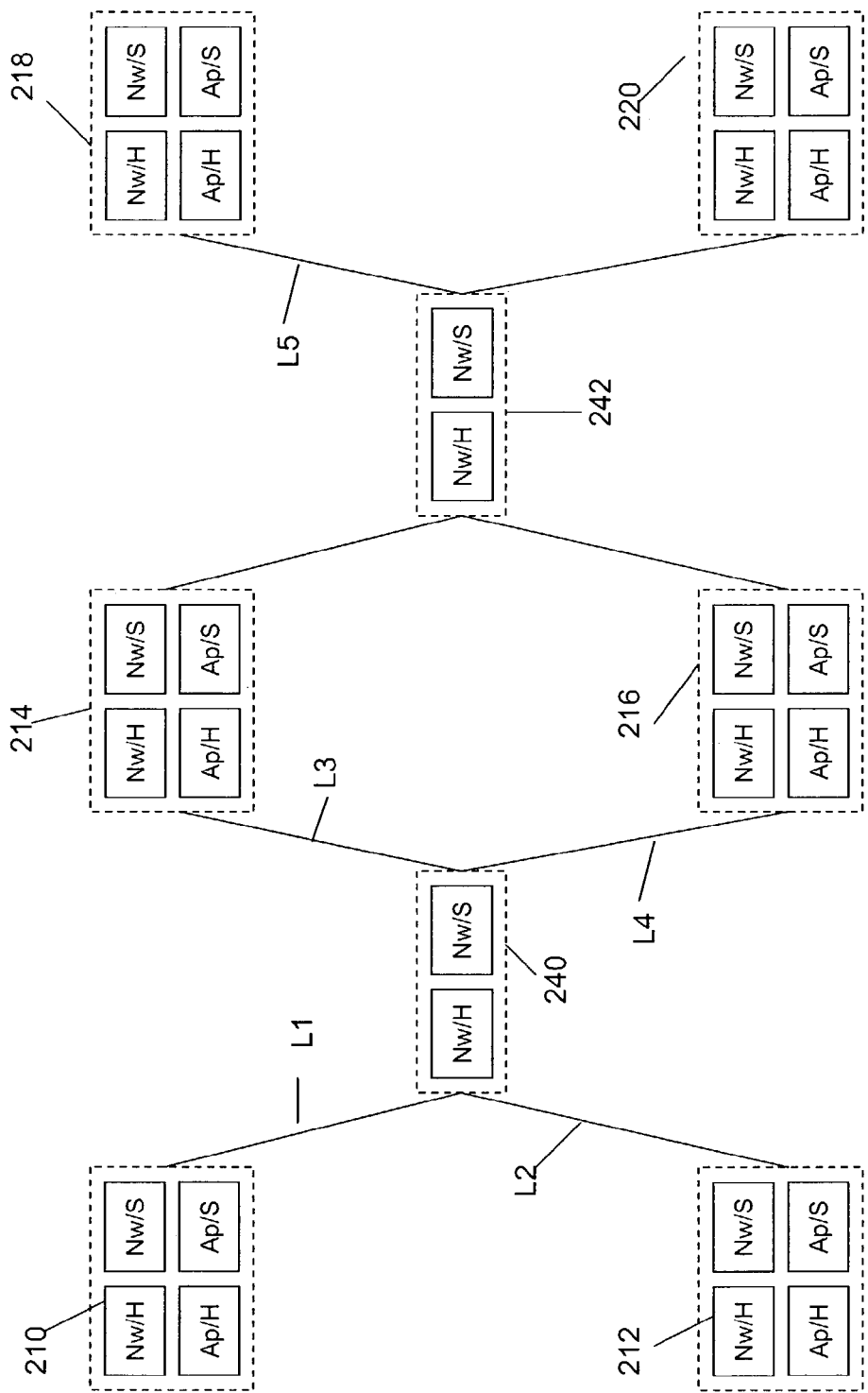
FIG. 1 is a schematic diagram of a part of an information technology network.

Referring now to FIG. 1, a part 10, known hereinafter as a subnet, of a larger network (typically the network of a large commercial organisation) comprises a plurality of computing entities, generically signified by squares or rectangles, connected by one or more network links (signified simply by lines) to one or more other computing entities. The term computing entity is a very general term, and in the present application it is intended to encompass (although not be limited to) any device or appliance which may be connected to a network, and which is capable of executing machine-readable instructions. Thus examples of computing entities are a desktop computer, a router (whether programmed in hardware of software or a mixture of both), a printer, a server, and so on.

For the purpose of administering the network an administrator defines functional blocks within the network, hereinafter known as resources. That which is defined as a resource is entirely within the discretion of the network administrator, so that resources may be defined in terms of computing entities (e.g. each "box" is a separate resource) and the network links between them, or in terms of blocks of several computing entities and interconnecting network links. Alternatively an administrator may chose to define resources at a much smaller level of functionality, so that functional elements within computing entities which have independent operability may be separately defined as resources. According to this approach, for example, a network card within a computer is one resource, and the software driver for the card within the same computer is a separate resource. Discretion of an administrator to define resources is not however an essential element of the present invention, and resources may be predefined in accordance with a predetermined policy, for example.

In the present illustrated example the subnet includes four PC computers, 210–216, two printers 218, 220, and two routers 240, 242, and all of these entities are illustrated at a level of particularity such that each entity is shown as including a network card and a driver (i.e. software) for the network card, e.g. 210 Nw/H, and 210 Nw/S respectively, while the PCs additionally include applications software, and hardware which enables this software to run, e.g. 210 Ap/S and 210 Ap/H respectively. In practice the printers also include other resources such as a print engine and ripping software, but this has not been considered as a separate part of the Applications hardware and Applications software in the present example, because, in the present illustrated example nothing turns on this. Thus the most specific definition of resource that is applicable in the present example would be to consider each network card, driver, applications software, and hardware on which the applications software runs as a separate resource, as well as the network links between the entities. However if desired each entity could be considered at even greater levels of particularity (for example considering the memory of the Applications Hardware separately), while in the first instance within the present example all of the functionally separable elements within a computing entity will be considered together as a resource, and each network link will be considered as a resource.

In the present example, a fault within the network is that applications software running (e.g. in the form of a word processing programme) on the computer 210 is unable successfully to execute a request to print out a document on printer 218. Thus failure of a service requested at one network node, and which in accordance with the service request is to be performed at a second network node constitutes a fault within the network. It should be appreciated however that this does not mean necessarily that the fault lies at either the first or second network nodes; the fault could equally be a result of a failure in connectivity between the network nodes. Furthermore, the service requested at the first network node need not be related to the provision of a service at the second network node, whether by applications software or otherwise, a service request from a first network node may simply be connection to a second network node. The first step in a diagnosis procedure is to identify resources which provide a network path between computer 210, and the printer 218. This step identifies the following paths:

210-L1-240-L3-214-L5-242-L7-218; and

210-L1-240-L4-216-L6-242-L7-218

Figure 2:
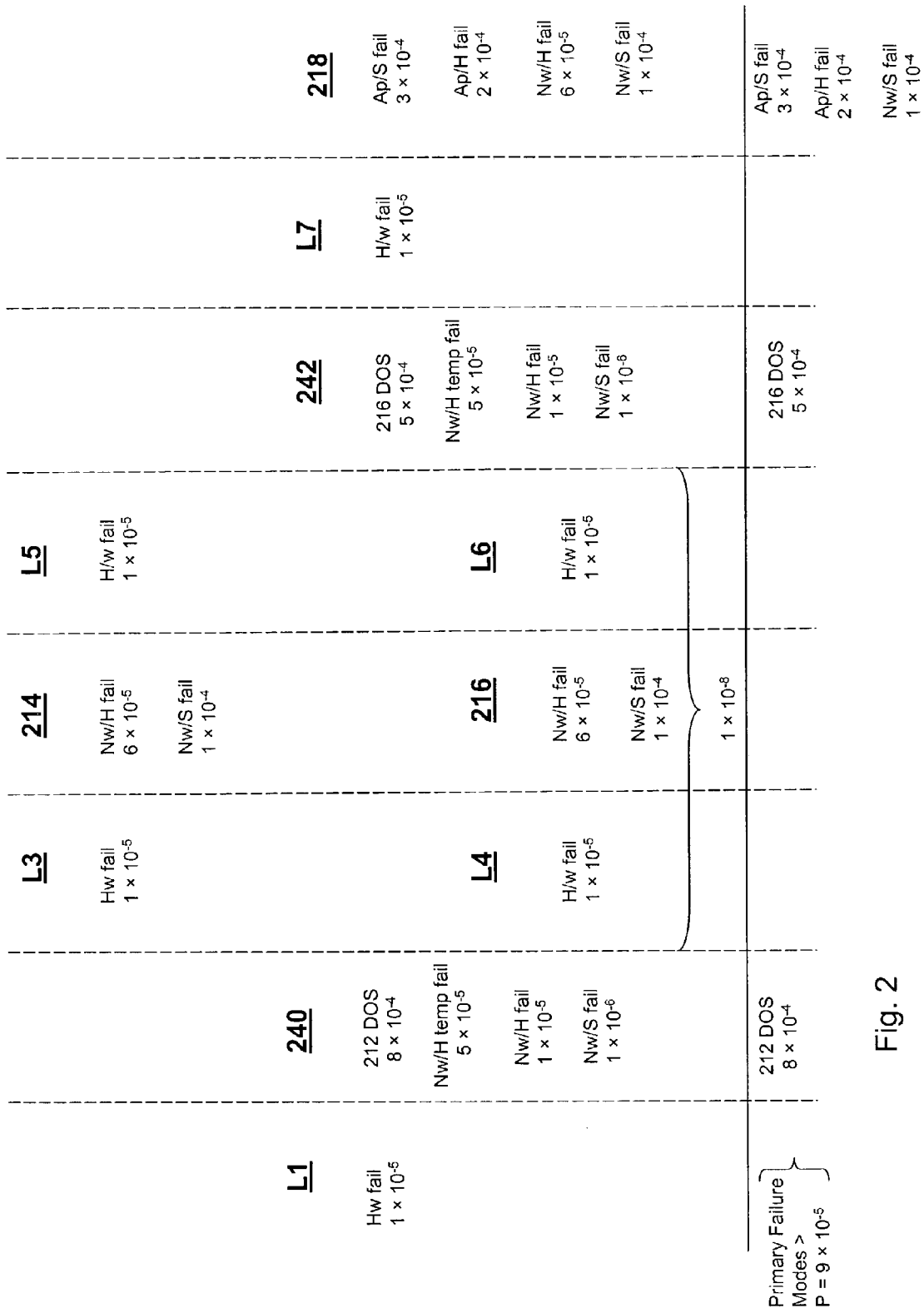
FIG. 2 is a schematic diagram of the failure modes for the network resources illustrated in FIG. 1.

From a comparison of these two pathways, it is possible to see that they are distinct only in the "middle" section: L3-214-L5 or L4-216-L6. Having identified the resources which comprise each of the network pathways from 210 to 218, the failure model (i.e. all the various modes of failure, together with an associated probability for each mode of failure) of each of these resources is then searched, and the failure models for each of these resources is illustrated in FIG. 2. For example, referring now to FIG. 2, the failure models for each of the resources are illustrated, and it can be seen that link L1 has only a single failure mode, which is that the hardware (i.e. in the case of a LAN cable, the wires within the cable, or the connectors at either end of the cable) has failed, and this has an associated probability of $1\times10^{-5}$. Router 240 has several failure modes within its failure model, the most probable is that computer 212 is malfunctioning in a manner that results in denial of the router's service (DOS) to computer 210 (whether simply by the emission of excessive network traffic for example as a result of viral infection, or . . . ). The two parallel and therefore alternate pathways (i.e. L3-214-L5 or L4-216-L6) have, in the present example, corresponding resources. For example links L3, L4 and L5, L6 each have the same failure model as link L1, computers 214 and 216 have the same failure models, which include a failure mode of a hardware failure (i.e. a physically broken network card), or software failure (i.e. a problem with the driver for the network card), with associated probabilities of $6\times10^{-5}$ and $1\times10^{-4}$ respectively. The router 242 has a failure model whose failure modes are qualitatively the same as that of router 240, but differs to the extent that the most probable failure mode, DOS as a result of the behaviour of computer 216, has a lower probability than the corresponding failure mode in the model for 240, the discrepancy being due to the lower susceptibility of computer 216 to viral attack and malfunction which is likely to result in DOS. Lastly, the printer 218 has a failure model in which the most probable mode of failure is of the applications hardware (i.e. the print engine in this instance), or the applications software (e.g. the ripping engine), but also contains failure modes based on failure of the network card and driver, as for all of the other computing entities under consideration.

Figure 3:
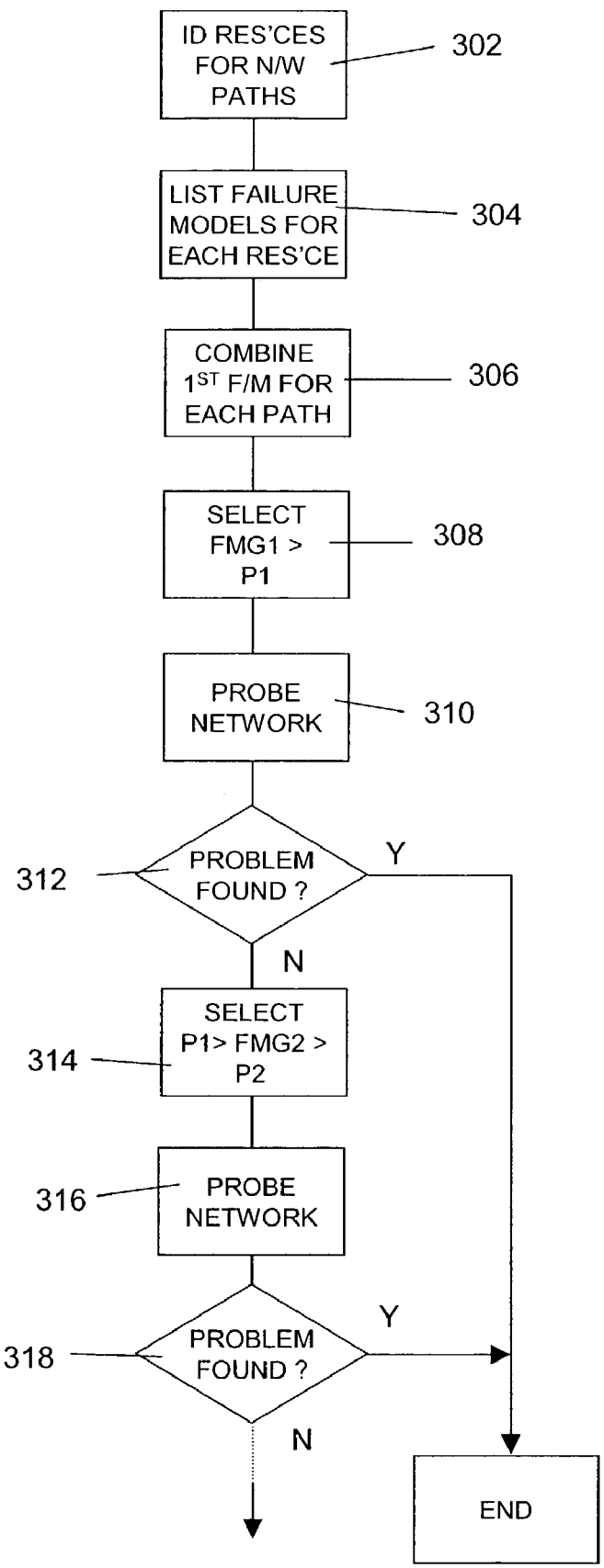
FIG. 3 is a flowchart illustrating a routine for diagnosing a fault within the subnet of FIG. 1.

Using this information, an administrator is then able to implement a routine, which is described in more detail in the flowchart of FIG. 3. Referring now to FIG. 3, the routine starts at step 302 with the identification of the resources which provide network pathways between the two network "end" nodes, i.e. the nodes of interest (which in the present example are the node from which service cannot be obtained, and the node at which the requested service is to be performed). Having identified the resources which form each network pathway which may be taken between the two network end nodes, the failure models for each of the resources are listed at step 304. As mentioned repeatedly, the particularity with which network resources are defined is discretionary, and the failure models may well be correspondingly adapted, so that, for example, where large numbers of computing entities and interstitial links are clustered together as a single resource, the failure model may well only display the most probable failure modes in the first instance, and so the failure model ought not necessarily be considered as an exhaustive list of all failure modes. At step 306, where there are alternate paths, such as in the present example L3-214-L5 or L4-216-L6, the most probable failure mode for each alternate path is selected and the two are combined by multiplying them together, to give the highest probability for combined or simultaneous failure of both alternate pathways (since where there are alternative pathways, if the failure lies in connectivity somewhere between the two end nodes, both pathways must simultaneously have connectivity problems to be the cause of such a connectivity failure), and this is then added as the most probable failure mode of a failure model for the part of the network with the alternate pathways, which is effectively constructed on an ad hoc basis. At step 308, the primary failure mode group, that is to say, all failure modes which have a probability in excess of a predetermined probability value P1 is selected, by grouping together all of the failure modes whose probability is greater than P1, and at step 310 each of these failure modes is investigated by probing the network, in a manner known per se, to establish whether any of the resources which are listed in the primary failure mode group are responsible for the failure. At step 312, if the problem has been located the routine then ends, but if the problem has not, then at step 314 a secondary failure mode group is selected, of failure modes having a probability less than P1, but greater than some lower value of probability P2, following which the network is once again probed to establish whether any of the failure modes in the secondary failure mode group is responsible; if they are then following step 318 the routine ends. If not, then in a continuation of the routine which is not explicitly illustrated in the flowchart of FIG. 3, a tertiary failure mode group is selected having yet lower probabilities, and so on until the problem has been located.

Figure 4:
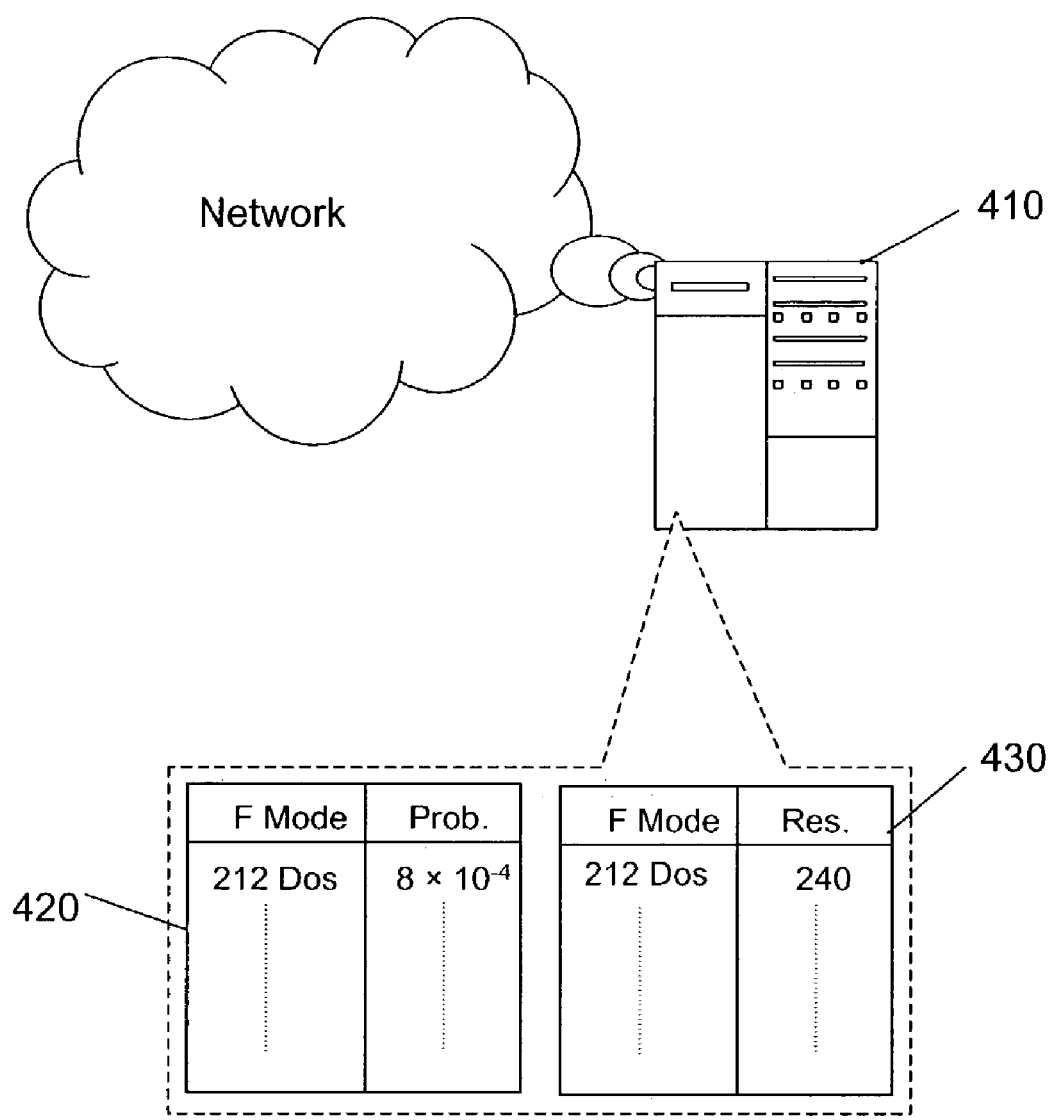
FIG. 4 is a schematic diagram of a part of an IT network having a database enabling fault diagnosis in accordance with a further embodiment of the present invention.

Referring now to FIG. 4, in a modification, failure modes of each resource are held in a database 410 connected to a network schematically represented by reference numeral 400 (having the resources illustrated in FIG. 1) having tables of failure mode against probability 420 and failure mode against resource 430. The database is update each time a resource is added to or removed from the network—resources added to the network typically broadcasting their presence, while resources which are removed can be established for example by specific probing if no activity has been logged from them for a while. Upon occurrence of a fault (and subject to computer power available in relation to the size of the network etc.) it is then possible simply to analyse the network as a whole without isolating specific candidate resources e.g. via a consideration of possible network pathways (as described above). In such a modification, the database will be queried to identify resources having failure modes greater than a first probability and the resources having these failure modes. These network resources are then probed. If the fault is not located a second query identifies resources having failure modes in a second, lower probability range, and these resources are then probed, and so on.

In the illustrated example hardwired network connections have been employed, having correspondingly simple failure models (although it is not represented that any failure model illustrated herein is exhaustive, but-merely illustrative). However wireless network links may equally be employed, such as wireless Ethernet operating on the basis of the 802.11 standard, and having additional failure modes such as loss of signal due to poor reception, failure of signal transmission or signal receiving module, and so on (all of which may be either defined as separate resources or together as a single resource as desired by an administrator).

The invention claimed is:

1. A method of diagnosing a fault within a network comprising a plurality of resources each of which has at least two operability states, the fault being manifested by failure of a service at a first network node and requested from a second network node, the method comprising steps of:
   identifying resources providing at least one candidate network pathway between the first and second nodes;
   for at least one candidate network pathway, listing failure modes of resources identified in respect of that pathway;
   selecting from the listed failure modes, a first group of failure modes having a probability in excess of a first probability;
   probing the network to establish if any of the first group of failure modes is the cause of the fault.

2. A method according to claim 1 wherein if none of the first group of failure modes is the cause of the fault, selecting from the listed failure mode, a second group of failure modes having a probability lower than the first probability, and greater than a second probability, and probing the network to establish of any of the second group of failure modes is the cause of the fault.

3. A method according to claim 1 wherein for alternate network pathways, at least one combined failure mode is generated having an associated probability, and wherein a most probable combined failure mode has a probability equal to the probability of simultaneous occurrence of the most probable failure mode for each alternate pathway.

4. A method according to claim 1 wherein resources are defined by an administrator as clusters of at least one computing entity and at least one network link.

5. A method according to claim 1 wherein resources are defined by an administrator as individual computing entities, and network links between computing entities.

6. A method according to claim 1 wherein resources are defined by an administrator as functional elements within computing entities and network links between computing entities.

7. A method according to claim 1 wherein the requested service is execution of a task by applications software.

8. A method according to claim 1 wherein the requested service is connection of the first network node to the second network node.

9. A method according to claim 1 wherein the failure model is a compositional model.

* * * * *